(12) United States Patent
Hachtmann et al.

(10) Patent No.: US 9,732,731 B2
(45) Date of Patent: Aug. 15, 2017

(54) PIVOTING PERCH FOR FLYING WIND TURBINE PARKING

(71) Applicant: X Development LLC, Mountain View, CA (US)

(72) Inventors: Brian Hachtmann, San Martin, CA (US); Damon Vander Lind, Alameda, CA (US); Maaike Louis Evers, San Francisco, CA (US); Michael Simonian, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 199 days.

(21) Appl. No.: 14/658,224

(22) Filed: Mar. 15, 2015

(65) Prior Publication Data
US 2016/0264260 A1 Sep. 15, 2016

(51) Int. Cl.
*B64F 1/00* (2006.01)
*B64F 1/36* (2017.01)
(Continued)

(52) U.S. Cl.
CPC ............ *F03D 7/0268* (2013.01); *B64C 31/06* (2013.01); *F03D 13/20* (2016.05);
(Continued)

(58) Field of Classification Search
CPC . B64C 31/06; B64C 39/002; B64C 2201/182; F03D 9/005; F03D 13/20;
(Continued)

(56) References Cited

U.S. PATENT DOCUMENTS 7,504,741 B2   3/2009  Wrage et al.
7,672,761 B2   3/2010  Wrage et al.
(Continued)

FOREIGN PATENT DOCUMENTS

EP        2631468       8/2013
WO     2013/049732     4/2013
(Continued)

OTHER PUBLICATIONS

International Searching Authority, International Search Report and Written Opinion mailed on Jun. 15, 2016, issued in connection with International Application No. PCT/US2016/019737, filed on Feb. 26, 2016, 18 pages.
(Continued)

*Primary Examiner* — Philip J Bonzell
(74) *Attorney, Agent, or Firm* — McDonnell Boehnen Hulbert & Berghoff LLP.

(57) ABSTRACT

An airborne wind turbine system is provided including an aerial vehicle having a fuselage, an electrically conductive tether having a first end secured to the aerial vehicle and a second end secured to a rotatable drum positioned on a tower onto which the tether is wrapped when the aerial vehicle is reeled in, a perch extending from the tower, one or more perch booms attached to the perch panel and pivotably mounted to the tower, wherein when the aerial vehicle is secured to the perch, the aerial vehicle is positionable in a lowered parked position, and wherein the aerial vehicle is movable to a raised parked position caused by rotation of the one or more perch booms with respect to the tower.

25 Claims, 9 Drawing Sheets

(51) Int. Cl.
*E01F 3/00* (2006.01)
*F03D 7/02* (2006.01)
*B64C 31/06* (2006.01)
*F03D 13/20* (2016.01)

(52) U.S. Cl.
CPC ... *F05B 2240/917* (2013.01); *F05B 2240/921* (2013.01); *Y02E 10/723* (2013.01); *Y02E 10/728* (2013.01)

(58) Field of Classification Search
CPC .... F03D 13/22; F03D 13/25; F05B 2240/917; F05B 2240/921; F05B 2240/93; F05B 2240/95; F05B 2240/96; B64F 1/12; B64F 1/14; B64F 3/00
See application file for complete search history.

(56) References Cited

U.S. PATENT DOCUMENTS

| | | | |
|---|---|---|---|
| 7,971,545 B2 | 7/2011 | Wrage | |
| 8,056,490 B2 | 11/2011 | Wrage | |
| 8,109,711 B2 | 2/2012 | Blumer et al. | |
| 8,421,257 B2 | 4/2013 | Chernyshov | |
| 8,888,049 B2 | 11/2014 | Vander Lind | |
| 9,156,565 B2* | 10/2015 | Hachtmann | B64F 1/12 |
| 9,212,032 B2* | 12/2015 | Vander Lind | B21C 23/00 |
| 9,212,033 B2* | 12/2015 | Vander Lind | B21C 23/00 |
| 9,248,910 B1* | 2/2016 | Vander Lind | B64F 1/36 |
| 9,308,975 B2* | 4/2016 | Vander Lind | B64C 39/022 |
| 9,327,845 B2* | 5/2016 | Vander Lind | B64C 39/022 |
| 9,352,832 B2* | 5/2016 | Vander Lind | B64C 31/06 |
| 9,353,033 B2* | 5/2016 | Vander Lind | F03D 9/002 |
| 9,458,829 B2* | 10/2016 | Hallamasek | F03D 13/20 |
| 2008/0048453 A1 | 2/2008 | Amick | |
| 2010/0013236 A1 | 1/2010 | Carroll | |
| 2010/0032948 A1 | 2/2010 | Bevirt | |
| 2010/0295303 A1 | 11/2010 | Lind et al. | |
| 2011/0101692 A1 | 5/2011 | Bilaniuk | |
| 2011/0127775 A1 | 6/2011 | Bevirt | |
| 2011/0260462 A1 | 10/2011 | Vander Lind | |
| 2012/0104763 A1 | 5/2012 | Lind | |
| 2012/0248770 A1 | 10/2012 | Byun | |
| 2013/0221154 A1 | 8/2013 | Vander Lind et al. | |
| 2013/0221679 A1 | 8/2013 | Vander Lind | |
| 2014/0326831 A1* | 11/2014 | Vander Lind | B64C 31/06 244/155 A |
| 2015/0183516 A1* | 7/2015 | Vander Lind | B64C 39/022 244/155 R |
| 2015/0183527 A1* | 7/2015 | Hachtmann | B64F 1/12 244/110 E |
| 2015/0183529 A1* | 7/2015 | Hachtmann | B66D 1/30 254/266 |
| 2015/0183617 A1* | 7/2015 | Vander Lind | B21C 23/00 244/154 |
| 2015/0184629 A1* | 7/2015 | Vander Lind | F03D 9/002 416/131 |
| 2015/0184638 A1* | 7/2015 | Vander Lind | B21C 23/00 242/601 |
| 2015/0232200 A1* | 8/2015 | Vander Lind | B64F 1/12 244/110 C |
| 2015/0251763 A1* | 9/2015 | Vander Lind | F03D 80/00 165/96 |
| 2015/0252788 A1* | 9/2015 | Vander Lind | F03D 11/00 416/95 |
| 2015/0298806 A1* | 10/2015 | Vander Lind | F03D 9/002 518/704 |
| 2015/0375847 A1* | 12/2015 | Kinne | F03D 5/00 244/48 |
| 2015/0375852 A1* | 12/2015 | Hallamasek | F03D 13/20 244/175 |
| 2016/0236776 A1* | 8/2016 | Vander Lind | B64C 31/06 |
| 2016/0318628 A1* | 11/2016 | Vander Lind | B64C 39/022 |

FOREIGN PATENT DOCUMENTS

| | | | |
|---|---|---|---|
| WO | 2013/156680 | 10/2013 | |
| WO | WO 2015102870 A1 * | 7/2015 | ............... B64F 1/12 |
| WO | WO 2015102912 A1 * | 7/2015 | ........... B64C 39/022 |

OTHER PUBLICATIONS

Makani Power, "How does it work?" http://makanipower.com/how-does-it-work, accessed Nov. 1, 2013, 3 pages.

Makani Power, "What is Airborne Wind Power?" http://makanipower.com/what-is-airborne-wind, accessed Nov. 1, 2013, 2 pages.

* cited by examiner

PIVOTING PERCH FOR FLYING WIND TURBINE PARKING

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an Airborne Wind Turbine (AWT).

SUMMARY

An airborne wind turbine system is provided that includes an upwardly rotatable perch structure positioned on a tower, where the perch structure enables safe, secure and stable landing of an aerial vehicle onto a perch. The perch structure includes a perch attached to one or more perch booms that extend from the top of the tower. The perch booms can pivot with respect to the top of the tower, so that the perch may be rotated above the tower. In operation, the aerial vehicle lands on, and is then secured to, the perch when the perch is in a lowered parked position. Once the aerial vehicle is secured to the perch, the perch booms may be caused to rotate to move the perch and aerial vehicle from the lowered parked position to a raised parked position. By raising the perch and aerial vehicle above the tower using the pivoting perch booms, the aerial vehicle may be moved further above the ground or water to the raised parked position to help prevent damage to the aerial vehicle and perch from vandalism, low altitude debris, and wave action in offshore applications. The rotors on the aerial vehicle may be used to power the aerial vehicle to rotate the aerial vehicle and perch into the raised parked position. Once the perch booms are in a desired raised position, a brake or locking mechanism may be utilized to lock the perch booms in a desired position with respect to the tower. In addition, the perch booms may be caused to rotate further to a second lowered parked position with the aerial vehicle pointing downwards with the rotors and propellers closer to ground where maintenance may be more easily and safely performed.

The rotatable perch structure advantageously provides for a shorter tower to be used during cross wind flight to reduce the overturning moment at the base, which in turn allows for a reduced overall mass of the tower and foundation (and floating platform in the offshore case) and resultant cost savings. However, by rotating the aerial vehicle and perch to the raised parked position, the aerial vehicle is raised further above the ground or water to reduce the danger of damage from vandalism and low altitude debris, and from wave action in the offshore case.

In another aspect, an airborne wind turbine system is provided including an aerial vehicle having a fuselage, an electrically conductive tether having a first end secured to the aerial vehicle and a second end secured to a rotatable drum positioned a tower onto which the tether is wrapped when the aerial vehicle is reeled in, a perch extending from the tower, one or more perch booms attached to the perch and pivotably mounted to the tower, wherein when the aerial vehicle is secured to the perch, the aerial vehicle is positionable in a lowered parked position, and wherein the aerial vehicle is movable to a raised parked position caused by rotation of the one or more perch booms with respect to the tower. In addition, the airborne wind turbine system may be positioned on a floating platform.

In a further aspect, a method of parking an aerial vehicle on an airborne wind turbine system in a raised parked position is provided, with the system including an aerial vehicle having a fuselage, an electrically conductive tether having a first end secured to the aerial vehicle and a second end secured to a rotatable drum positioned on a tower onto which the tether is wrapped when the aerial vehicle is reeled in, a perch extending from the tower, one or more perch booms attached to the perch and pivotably mounted to the tower, including the steps of securing the aerial vehicle to the perch when the perch is in a lowered parked position, and rotating the one or more perch booms with respect to the tower to raise the aerial vehicle to a raised parked position on the perch.

The aerial vehicle may further include a peg positioned on the fuselage and the perch may comprise a perch panel, and the securing step may further include latching the peg to a perch panel. Further, the step of rotating the one or more perch booms with respect to the tower may be caused at least in part by operating one or more motors positioned on the aerial vehicle. In addition, the method may further include the step of locking the one or perch booms in place with respect to the tower when the aerial vehicle is in the raised parked position.

In another aspect, a perching system for use in an airborne wind turbine system is provided including a perching tower, a perch extending from the tower, the perch adapted to receive an aerial vehicle, one or more perch booms attached to the perch and pivotably mounted to the tower, wherein when the aerial vehicle is secured to the perch, the perch and aerial vehicle are positionable in a lowered parked position, and wherein the perch and aerial vehicle are movable to a raised parked position caused by rotation of the one or more perch booms with respect to the tower. The perching system may be further configured such that rotation of the one or more perch booms with respect to the perching tower is caused at least in part by operating one or more motors positioned on the aerial vehicle. In addition, the perching system may be positioned on a floating platform.

In another aspect, means for moving an aerial vehicle secured to a perch structure of an airborne wind turbine system from a first lowered parked position to a raised parked position is provided; and means for moving an aerial vehicle secured to a perch structure of an airborne wind turbine system from a raised parked position to a second lowered parked position is provided.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 5 is a perspective view of peg 128 extending from fuselage 124 and in contact with perch panel side 160a.

DETAILED DESCRIPTION

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments may include more or less of each element shown in a given Figure. Further, some of the illustrated elements may be combined or omitted. Yet further, an example embodiment may include elements that are not illustrated in the Figures.

1. Overview

Example embodiments relate to aerial vehicles, which may be used in a wind energy system, such as an Airborne Wind Turbine (AWT). In particular, illustrative embodiments may relate to or take the form of methods and systems using an airborne vehicle that is attached to a tower or ground station using an electrically conductive tether.

Wind energy systems, such as an AWT, may be used to convert wind energy to electrical energy. An AWT is a wind based energy generation device that may include an aerial vehicle constructed of a rigid wing with mounted turbines. The aerial vehicle may be operable to fly in a path across the wind, such as a substantially circular path above the ground (or water) to convert kinetic wind energy to electrical energy. In such cross wind flight, the aerial vehicle flies across the wind in a circular pattern similar to the tip of a wind turbine. The rotors attached to the rigid wing may be used to generate power by slowing the wing down. In particular, air moving across the turbine blades may force the blades to rotate, driving a generator to produce electricity. The aerial vehicle may also be connected to a tower or ground station via an electrically conductive tether that transmits power generated by the aerial vehicle to the tower, and on to the grid.

When it is desired to land the aerial vehicle, the electrically conductive tether may be wound onto a spool or drum on the tower, which reels in the aerial vehicle towards a perch on the tower. Prior to landing on the perch, the aerial vehicle may transition from a flying mode to a hover mode. After the aerial vehicle transitions to hover mode, the tether may be wound onto the drum until the aerial vehicle comes to rest on the perch.

The perch for the aerial vehicle should provide a reliable, safe place to store the aerial vehicle when it is not in use. In windy conditions, the perch should be able to maintain a desired positioning of the aerial vehicle on the perch. Furthermore, during landing of the aerial vehicle on the perch there could be undesirable pitching, rolling, or yawing of the aerial vehicle (caused by gusts of wind for example) while the aerial vehicle is in contact with the perch, but before the aerial vehicle has fully landed on the perch. During this critical period it would be desirable for the perch to provide a restoring force to center the aerial vehicle on the perch.

Furthermore, in the event of pitch, roll, or yaw of the aerial vehicle it would be desirable for there to be very little movement of the aerial vehicle at a point of contact between the aerial vehicle and perch, to provide greater stability to aerial vehicle/perch interaction.

Airborne wind turbines may provide significant advantages over conventional wind turbines. For example, airborne wind turbines may fly at a distance of 500 meters above the ground where the wind is significantly stronger than closer to the ground (e.g. 70 meters) where conventional wind turbines are positioned. The wind at 500 meters may provide twice the power as wind at 70 meters. In addition, conventional wind turbines typically require huge blades and large towers to support the blades. Manufacturing, transporting, and maintaining the blades and towers are very costly, compared to an airborne wind turbine.

Furthermore, conventional wind turbines typically require a gearbox to increase the rotations per minute ("rpm") of the spinning turbine blades to a rate that is useful for a generator. Gearboxes can be expensive and prone to failure. In an example AWT, the aerial vehicle may fly at 100-150 miles per hour, with the much smaller propellers spinning at a rate of 1000 rpm, so that a gearbox is not required. Moreover, because a large tower and inner portion of large turbine blades are not required, the material costs of an airborne wind turbine are less than the cost of a conventional wind turbine by a factor of 10.

In addition, airborne wind turbines may provide another significant advantage over conventional wind turbine when it comes to offshore power generation. In particular, strong, consistent winds may be found in deep offshore locations (e.g., in water that is 30 meters deep or deeper). However, because of the large gyroscopic loads caused by its spinning blades, the top of a conventional wind turbine may not be able to tolerate the sway which can result due to wind, current and waves. If a floating platform is used to support a conventional wind turbine, this may require a tremendous amount of ballast to prevent the top of the wind turbine from swaying due to wave action, currents, and/or wind. Therefore, a floating platform for a conventional wind turbine may not be practical.

Accordingly, for offshore applications, conventional wind turbines typically have towers extending from above the ocean surface down to the seabed. Thus, the deeper the water the greater the size of the tower and foundation required, and the greater the moment about the base of the tower caused by the spinning turbine blades. Therefore, the use of conventional wind turbines for deep water applications may not be viable. In particular, the cost of building and/or installing such towers and foundations may be prohibitively expensive in many offshore locations.

Flying wind turbines are competitive because of their structural efficiency. One of the greatest efficiencies comes from the low traction point (short tower), especially in the offshore case, where a lowered traction point for cross wind flight provides for a lower overturning moment, which advantageously results in significantly lower tower and floating platform mass.

Whether on land or offshore, it is desirable to provide the shortest tower possible during cross wind flight to reduce the overturning moment at the base, which in turn allows for a reduced overall mass of the tower and foundation, and resultant cost savings. The shorter the tower, the lower the overturning moment, the lower the overall mass of the tower and floating platform, and the higher the resultant cost savings.

However, when the aerial vehicle is in a parked position on the perch, there is a danger of damage from vandalism and low altitude debris, and from wave action in the offshore case. Therefore, it would be desirable to provide a tower offering an ability to keep the aerial vehicle high off the ground in its parked condition, to protect it from waves, vandalism, low altitude debris, etc., yet also provide the advantages of having a short tower.

In an example embodiment, an airborne wind turbine system is provided that includes a perch structure positioned on a tower. The perch structure includes a perch attached to one or more perch booms that extend from the top of the tower. The perch booms can pivot with respect to the top of the tower, so that the perch may be rotated above the tower. Thus, in operation, the aerial vehicle lands on, and is secured to, the perch when the perch is in a lowered parked position. Once the aerial vehicle is secured to the perch, the perch booms may be caused to rotate upwardly relative to the tower to move the perch and aerial vehicle from the lowered parked position to a raised parked position. Rotation of the perch booms relative to the tower to move the perch and aerial vehicle into the raised parked position may be caused by the rotors on the aerial vehicle itself. Alternately, or in addition, hydraulic or electric motors may be used to cause rotation of the perch and aerial vehicle to the raised parked position. By raising the perch and aerial vehicle above the tower using the pivoting perch booms, the aerial vehicle may be moved further above the ground or water to the second raised position, to prevent damage from vandalism and low altitude debris, and wave action in the offshore case.

In an example embodiment, the perch may comprise a perch panel that extends from an airborne wind turbine. The perch panel may include a first side and a second side that are joined together along their respective inner edges. The aerial vehicle may be viewed as sitting on a sphere when positioned on the perch panel. The first and second sides of the perch panel may be formed as disparate surface sections of a sphere that have been brought into contact to provide a vertically oriented V-shaped groove having a bottom where the inner edges of the first and second sides of the perch panel are joined.

The perch panel is supported by one or more perch panel support members or perch booms that extend generally horizontally from a perch platform positioned on the tower. The perch panel platform may rotate about the top of the tower so that the perch panel is in proper position when the aerial vehicle is landing.

The aerial vehicle may include a peg that extends from the fuselage of the aerial vehicle. When the aerial vehicle is in hover mode during landing, the peg extends downwardly and outwardly from the fuselage towards the perch panel. The perch panel may be aligned with the tether being wound onto a rotatable drum such that the perch panel faces the fuselage of the aerial vehicle when it is landing. For example, if a drum rotatable about a horizontal axis is used, the perch platform could be coupled to the drum such that the perch platform extends perpendicularly from the axis of the drum and the tether is wound onto the drum over the perch panel. In this manner as the tether is wound onto the drum, the perch panel will always face the aerial vehicle and be in position to receive the peg on the fuselage of the aerial vehicle. In fact, the drum could be positioned on the perch platform such that the tether (or center tether bridle) extends over the bottom of the groove of the perch panel.

The peg may be positioned on the center of the fuselage extending beneath the center tether bridle during landing. As the tether is further wound onto the drum, the bottom of the peg comes into contact with the perch panel. The curved, spherical surface sections of the first and second sides of the perch panel form a groove and the force of the peg against the perch panel forces the end of the peg down the curved surface of the side of the panel and into the bottom of the groove. Thus, the peg may not initially contact the bottom of the groove as the aerial vehicle is landing. Instead, the peg may initially come into contact with the first or second side of the perch panel. The force of the tether pulling on the fuselage and the peg pressure against the panel resultant of the pitching moment created by the propellers of the aerial vehicle will cause the peg to move across the curved surface of the side of the perch panel it initially contacted and move down the curved surface into the bottom of the groove on the perch panel.

The peg is preferably located at or near the center of gravity of the aerial vehicle, such as at a point located at or near the intersection of the axes of pitch, roll, and yaw. As a result, there will be little or no movement of the peg during pitch, roll, or yaw of the aerial vehicle. Therefore, there will be little or no movement of the aerial vehicle at its point of contact with the perch panel.

A bar, such as a T-bar may extend from both sides of the perch panel. A pair of hooks may be attached to the aerial wing, positioned on opposite sides of the peg. Each hook may be located at a point equidistant from the peg. The hooks may be positioned on the wing or on the pylons that attach the rotors to the wing of the aerial vehicle. As the aerial vehicle descends during landing, the peg moves downwardly into contact with the bottom of the groove of the perch panel. As the aerial vehicle further descends, the hooks come into contact with the sides of the T-bar and ultimately rest on top of the sides of the T-bar when the aerial vehicle is perched.

Once the aerial vehicle comes into a final resting place, there are four points of contact between the aerial vehicle and the tower to provide a stable final perch for the aerial vehicle. In particular, the tether remains attached to the wing and the bridle exerts a force on the vehicle pulling the vehicle towards the tower. At the same time the perch panel exerts a force against the peg holding the aerial vehicle tightly to the tower. Further, the T-bar contacts the hooks preventing the top of the aerial vehicle from pitching towards the ground station. The weight of the aerial vehicle concentrated at the points of contact between the pair of hooks on the sides of the T-bar prevent the yawing or rolling of the aerial vehicle in its final perched position.

During the critical period between initial contact of the peg with the perch panel and the contact between the pair of hooks and the sides of the T-bar, if there are windy, or gusty conditions, pitching or yawing of the aerial vehicle may be controlled during this critical period with the propellers of the rotors. For example, more or less power from the right or left rotors could be used to control yaw and more or less power from the lower or upper rotors could be used to control pitch.

A latch mechanism may be positioned on the perch panel to further secure the peg to the perch panel. Once the aerial vehicle is secured to the perch panel, the perch booms may be caused to rotate to move the perch panel and aerial vehicle to the raised parked position. The rotors on the aerial vehicle may be used to power the aerial vehicle to rotate the aerial vehicle and perch panel into the second raised position. Once in the desired raised position, a brake or locking mechanism may be utilized to lock the perch booms in a desired position with respect to the tower. Alternatively, or in addition to using the rotors on the aerial to cause the perch booms to rotate with respect to the top of the tower to move the perch panel and aerial vehicle into the second raised position, an electric motor and/or hydraulic motor may be positioned on or in the tower to cause the rotation of the perch booms about the top of the tower.

The present embodiments utilize a perch structure and mechanism that is capable of having the perch panel swing upwardly from a lower parked position to a raised parked position, and also include a method of securing the aerial vehicle to the perch panel, and rotating the perch booms relative to the tower to move the perch panel and secured aerial vehicle into the raised parked position.

It will be appreciated that in the lowered parked position, the fuselage of the aerial vehicle is pointed downward, and that when the aerial vehicle is moved into the raised parked position, the fuselage is moved to a generally horizontal position. Thus, additional clearance from the ground or water is gained not only by the length of the perch boom, but also by the change in orientation of the fuselage of the aerial vehicle. In one embodiment, the rotation of the perch booms may provide 10 meters of additional clearance based on a 6 meter perch boom length, and 4 meters gained by the change in orientation of the aerial vehicle.

This system also provides the advantage of utilizing hardware that is already being used (i.e., perch panel, perch booms, wing motors) with minimal new hardware (perch boom pivot) to afford a significant improvement in system efficiency. In particular a shorter tower may be used so as to allow a lower overturning moment which in turn allows the use of less mass in the tower, and the use of a smaller floating platform (having less mass) in the offshore applications. The reduced mass in the tower and the smaller floating platform allow for a reduction in material and costs, resulting in significant cost savings.

In addition, the pivoting perch booms allow the aerial vehicle to be parked in a raised parked position, providing further clearance from the ground or waves without the need for a taller tower, or a larger floating platform in the offshore case. Moreover, the overturning moment remains the same regardless of the depth of the water because the tether extends to the platform just above sea level, rather than to the seabed. This is particularly advantageous in deeper offshore applications.

Furthermore, the system may also provide for further rotation of the aerial vehicle and perch from the raised parked position to a second lowered parked position where the front of the aerial vehicle is pointing downwards. In the second lowered parked position, the rotors and propellers are close to ground where maintenance may be more easily performed than when the aerial vehicle is in the first lowered park position pointing upwards or in the raised parked position. As a result, maintenance personnel can perform maintenance more easily and safely as they are closer to the ground.

2. Illustrative Airborne Wind Turbines

Figure 1:
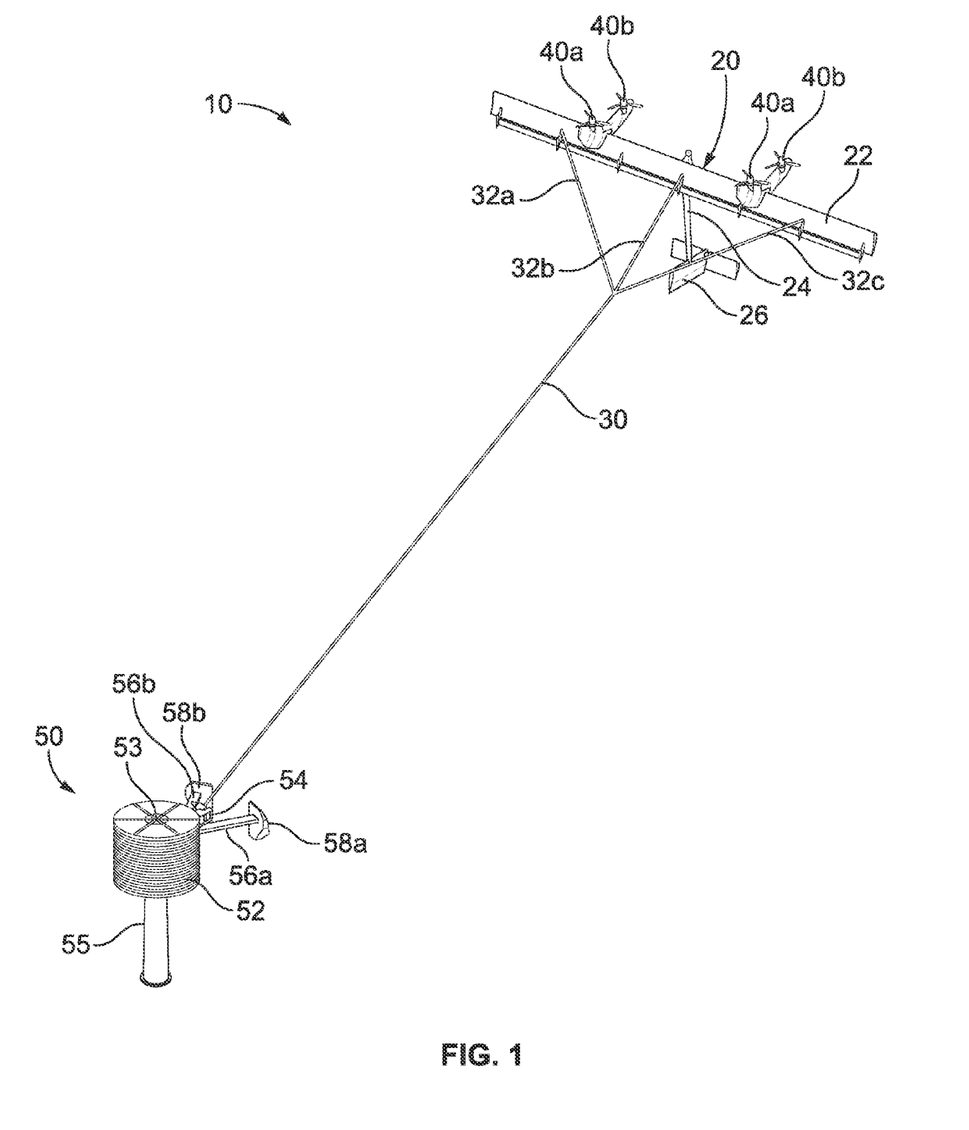
FIG. 1 is a perspective view of an airborne wind turbine 10 including aerial vehicle 20 attached to a tower 50 with an electrically conductive tether 30, according to an example embodiment.
Figure 2:
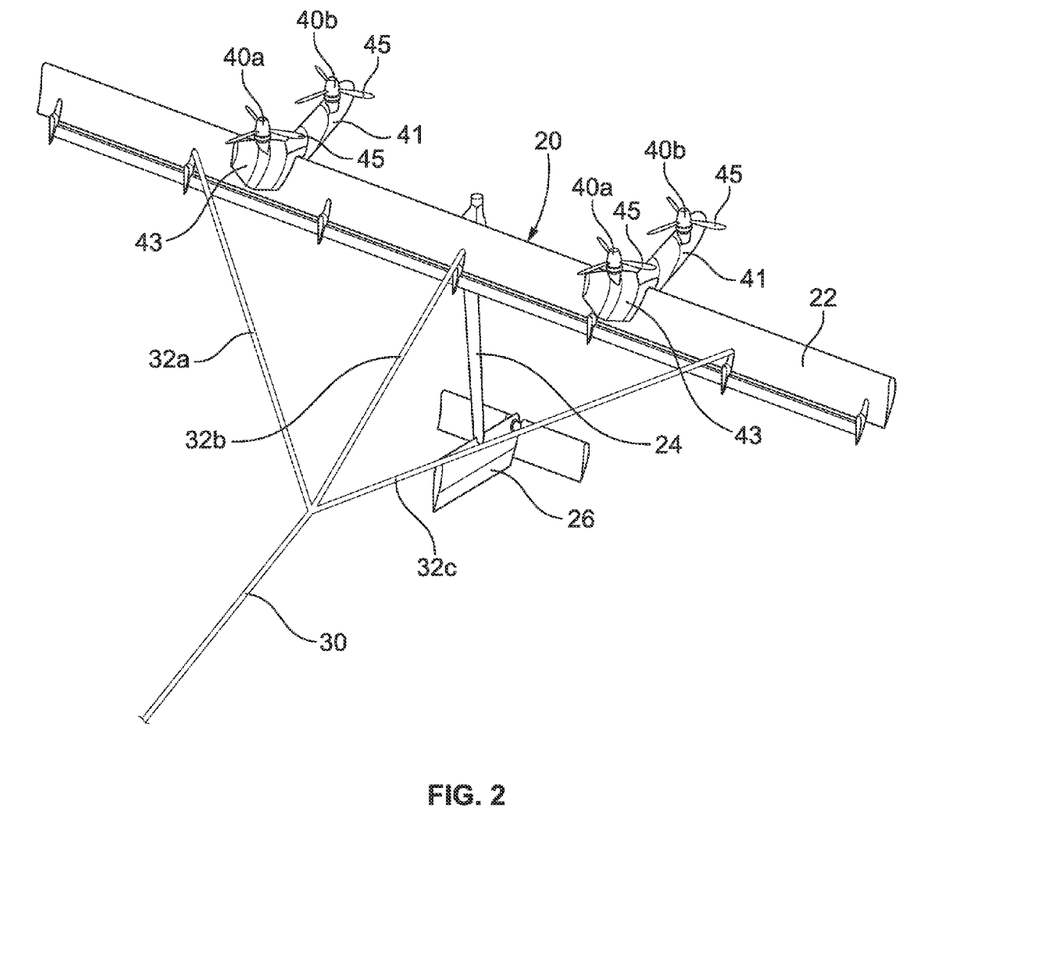
FIG. 2 is a close-up perspective view of aerial vehicle 20 shown in FIG. 1.

As disclosed in FIGS. 1-2, an airborne wind turbine (AWT) 10 is disclosed, according to an example embodiment. AWT 10 is a wind based energy generation device that includes an aerial vehicle 20 constructed of a rigid wing 22 with mounted turbines 40 that flies in a path, such as a substantially circular path, across the wind. In an example embodiment, the aerial vehicle may fly between 250 and 600 meters above the ground (or water) to convert kinetic wind energy to electrical energy. However, an aerial vehicle may fly at other heights without departing from the scope of the invention. In the cross wind flight, the aerial vehicle 20 flies across the wind in a circular pattern similar to the tip of a wind turbine. The rotors 40 attached to the rigid wing 22 are used to generate power by slowing the wing 22 down. Air moving across the turbine blades forces them to rotate, driving a generator to produce electricity. The aerial vehicle 20 is connected to a tower or ground station 50 via an electrically conductive tether 30 that transmits power generated by the aerial vehicle to the ground station 50, and on to the grid. As used herein, the term "tower" is to be broadly construed and includes any structure to which an aerial vehicle, such as aerial vehicle 20, may be tethered, or may be parked on.

As shown in FIG. 1, the aerial vehicle 20 may be connected to the tether 30, and the tether 30 may be connected to the tower or ground station 50. In this example, the tether 30 may be attached to the tower 50 at one location on the tower 50, and attached to the aerial vehicle 20 at three locations on the aerial vehicle 2 using bridal 32a, 32b, and 32c. However, in other examples, the tether 30 may be attached at multiple locations to any part of the tower 50 and/or the aerial vehicle 20.

The tower 50 may be used to hold and/or support the aerial vehicle 20 until it is in an operational mode. The tower 50 may include a support 55 that may be on the order of 15 meters tall. The tower 50 may also include a drum 52 rotatable about drum axis 53 that is used to reel in aerial vehicle 20 by winding the tether 30 onto the rotatable drum 52. In this example, the drum 52 is oriented vertically, although the drum may also be oriented horizontally (or at an angle). Further, the tower 50 may be further configured to receive the aerial vehicle 20 during a landing. For example, support members or perch booms 56a, 56b are attached to perch panels 58a, 58b that extend from the tower 50. When the tether 30 is wound onto drum 52 and the aerial vehicle 20 is reeled in towards the tower 50, the aerial vehicle may come to rest upon perch panels 58a, 58b. The tower 50 may be formed of any material that can suitably keep the aerial vehicle 20 attached and/or anchored to the ground (or floating platform) while in hover flight, forward flight, or crosswind flight. In some implementations, tower 50 may be configured for use on land. However, tower 50 may also be implemented on a body of water, such as a lake, river, sea, or ocean. For example, a tower could include be arranged on a floating off-shore platform or a boat, among other possibilities. Further, tower 50 may be configured to remain stationary or to move relative to the ground or the surface of a body of water.

The tether 30 may transmit electrical energy generated by the aerial vehicle 20 to the tower 50. In addition, the tether 30 may transmit electricity to the aerial vehicle 20 in order to power the aerial vehicle 20 during takeoff, landing, hover flight, and/or forward flight. The tether 30 may be constructed in any form and using any material which may allow for the transmission, delivery, and/or harnessing of electrical energy generated by the aerial vehicle 20 and/or transmission of electricity to the aerial vehicle 20. The tether 30 may also be configured to withstand one or more forces of the aerial vehicle 20 when the aerial vehicle 20 is in an operational mode. For example, the tether 30 may include a core configured to withstand one or more forces of the aerial vehicle 20 when the aerial vehicle 20 is in hover flight, forward flight, and/or crosswind flight. The core may be constructed of any high strength fibers or a carbon fiber rod. In some examples, the tether 30 may have a fixed length and/or a variable length. For example, in one example, the tether has a fixed length of 500 meters.

The aerial vehicle 20 may include or take the form of various types of devices, such as a kite, a helicopter, a wing and/or an airplane, among other possibilities. The aerial vehicle 20 may be formed of solid structures of metal, plastic and/or other polymers. The aerial vehicle 20 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

As shown in FIG. 1, and in greater detail in FIG. 2, the aerial vehicle 20 may include a main wing 22, rotors 40*a* and 40*b*, tail boom or fuselage 24, and tail wing 26. Any of these components may be shaped in any form which allows for the use of components of lift to resist gravity and/or move the aerial vehicle 20 forward.

The main wing 22 may provide a primary lift for the aerial vehicle 20. The main wing 22 may be one or more rigid or flexible airfoils, and may include various control surfaces, such as winglets, flaps, rudders, elevators, etc. The control surfaces may be used to stabilize the aerial vehicle 20 and/or reduce drag on the aerial vehicle 20 during hover flight, forward flight, and/or crosswind flight. The main wing 22 may be any suitable material for the aerial vehicle 20 to engage in hover flight, forward flight, and/or crosswind flight. For example, the main wing 20 may include carbon fiber and/or e-glass.

Rotor connectors 43 may be used to connect the upper rotors 40*a* to the main wing 22, and rotor connectors 41 may be used to connect the lower rotors 40*b* to the main wing 22. In some examples, the rotor connectors 43 and 41 may take the form of or be similar in form to one or more pylons. In this example, the rotor connectors 43 and 41 are arranged such that the upper rotors 40*a* are positioned above the wing 22 and the lower rotors 40*b* are positioned below the wing 22.

The rotors 40*a* and 40*b* may be configured to drive one or more generators for the purpose of generating electrical energy. In this example, the rotors 40*a* and 40*b* may each include one or more blades 45, such as three blades. The one or more rotor blades 45 may rotate via interactions with the wind and which could be used to drive the one or more generators. In addition, the rotors 40*a* and 40*b* may also be configured to provide a thrust to the aerial vehicle 20 during flight. With this arrangement, the rotors 40*a* and 40*b* may function as one or more propulsion units, such as a propeller. Although the rotors 40*a* and 40*b* are depicted as four rotors in this example, in other examples the aerial vehicle 20 may include any number of rotors, such as less than four rotors or more than four rotors, e.g. six or eight rotors.

Referring back to FIG. 1, when it is desired to land the aerial vehicle 20, the drum 52 is rotated to reel in the aerial vehicle 20 towards the perch panels 58*a*, 58*b* on the tower 50, and the electrically conductive tether 30 is wound onto drum 52. Prior to landing on the perch panels 58, the aerial vehicle 20 transitions from a flying mode to a hover mode where the fuselage 24 extends downwardly. The drum 52 is further rotated to further wind the tether 30 onto the drum 52 until the aerial vehicle 20 comes to rest on the perch panels 58*a*, 58*b*.

Figure 3:
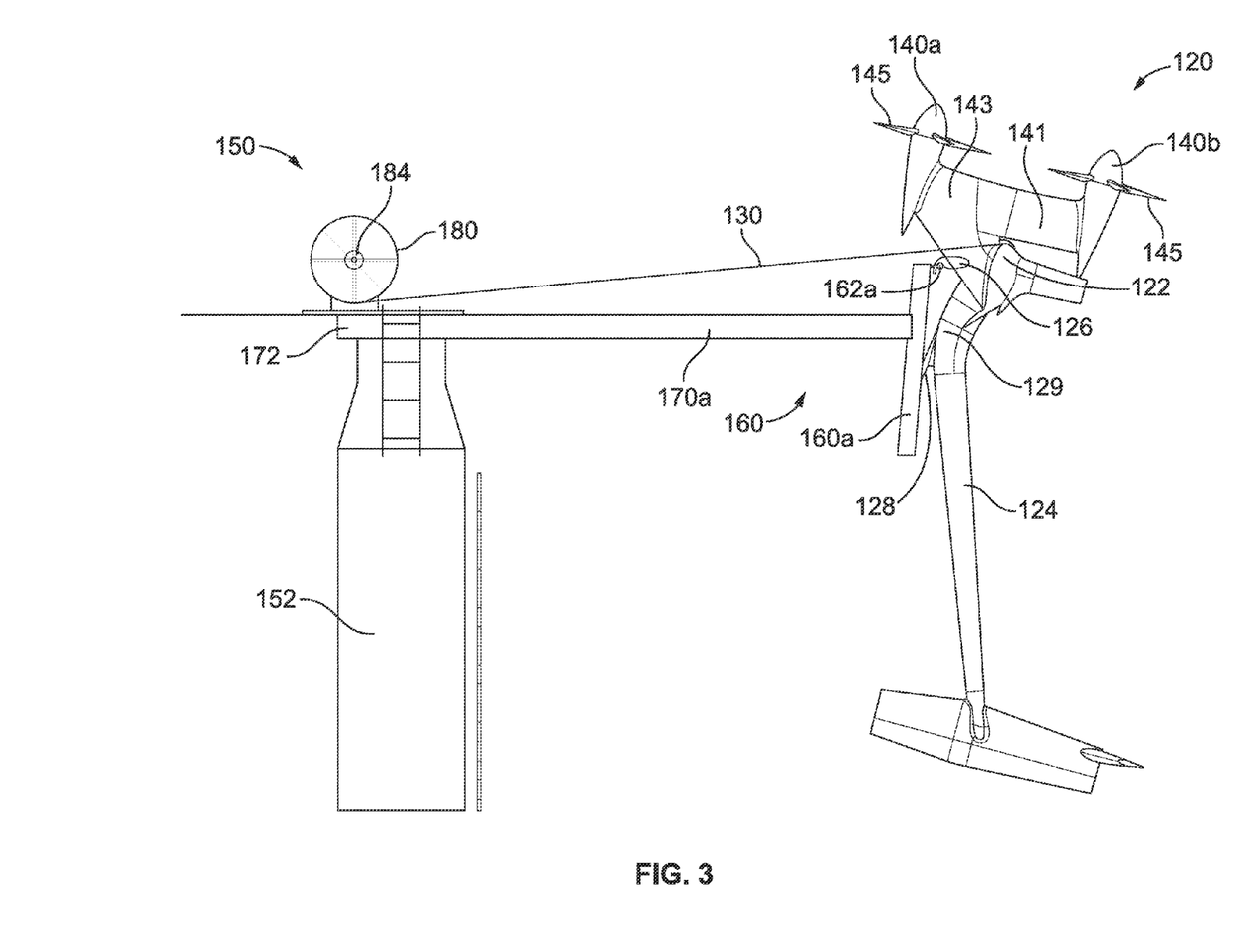
FIG. 3 is a side view of aerial vehicle 120 perched on perch panel 160 attached to tower 150, according to an example embodiment.
Figure 4:
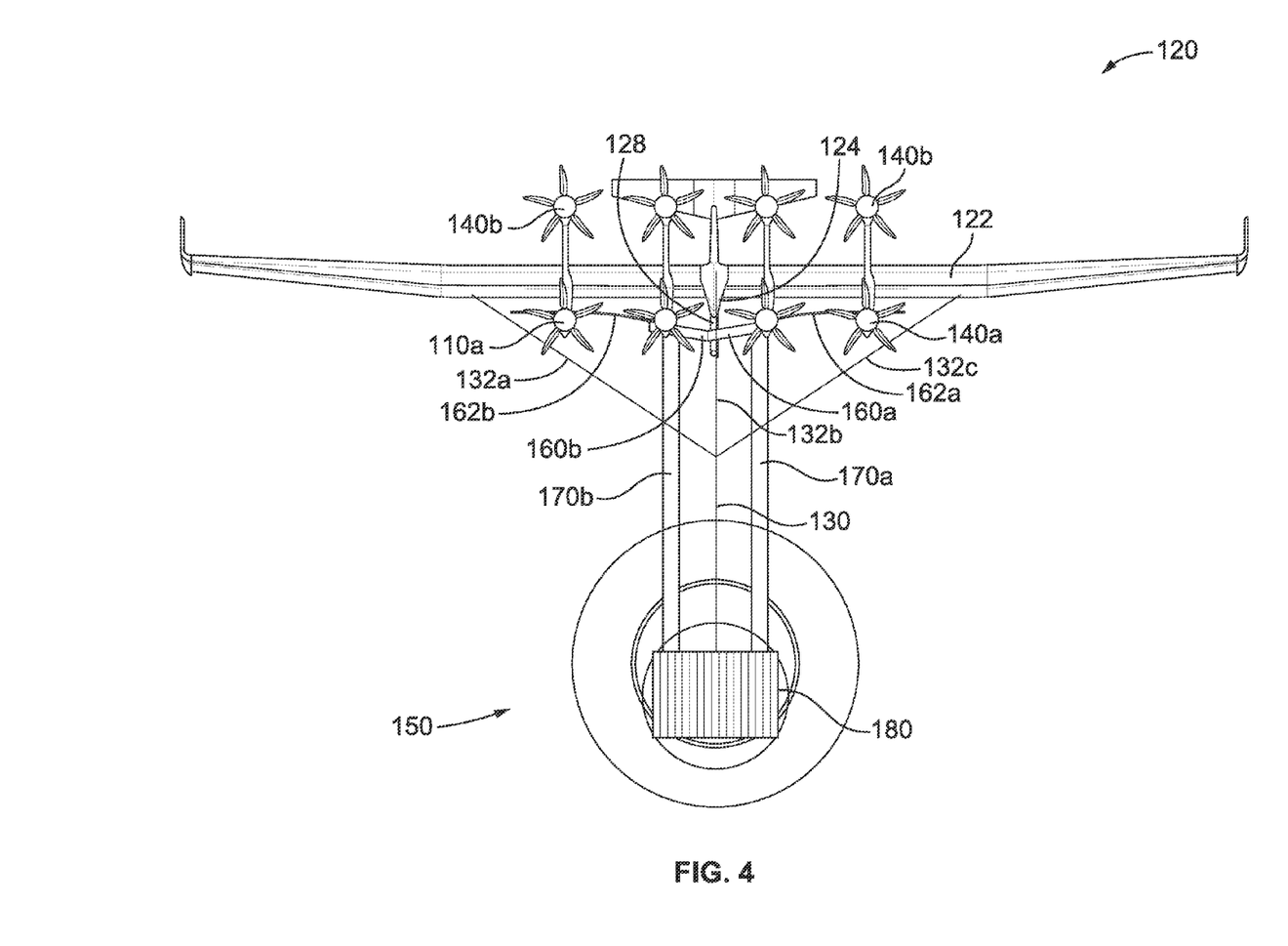
FIG. 4 is a top view of the aerial vehicle 120 and tower 150 shown in FIG. 3, according to an example embodiment.

FIG. 3 is a side view of an airborne wind turbine system including aerial vehicle 120 perched on perch panel 160 attached to tower 150, and FIG. 4 is a top view of the aerial vehicle 120 and tower 150 shown in FIG. 3, according to an example embodiment. In FIGS. 3 and 4, tower 150 includes a support 152 upon which rotatable drum 180 and is positioned. In an embodiment, the support 152 may be 15 meters in height. An electrically conductive tether 130 is attached to wing 122 of aerial vehicle 120 using bridle lines 132*a*, 132*b*, and 132*c*. In one embodiment the bridle lines 132*a*, 132*b*, and 132*c* may be attached at asymmetric locations along the span of the wing 122, such that the inboard side of wing 122 has the bridle attached further from the wingtip, and the outboard side of the wing 122 has the bridle attached closer to the outboard wingtip. Such an asymmetric configuration allows the bridle lines 132*a* and 132*c* to better clear a larger sized perch panel.

The perch panel 160 is supported by perch panel support members 170*a* and 170*b* that extend horizontally from a perch platform 172 positioned on the tower 150. The perch platform 172 may rotate about the top of the support 52 so that the perch panel 160 is in proper position when the aerial vehicle 120 is landing. Aerial vehicle 120 includes lower rotors 140*a* mounted on pylons 143 attached to wing 122 and upper rotors 140*b* mounted on pylons 143 attached to wing having propellers 145. In an embodiment, wing 122 is 4 meters long. Aerial vehicle includes a fuselage 124 having a curved section 129 to which a peg 128 is attached. In a perched condition, as shown in FIGS. 3 and 4, peg 128 contacts perch panel 160 which is constructed of a first side 160*a* and a second side 160*b*.

Figure 5:
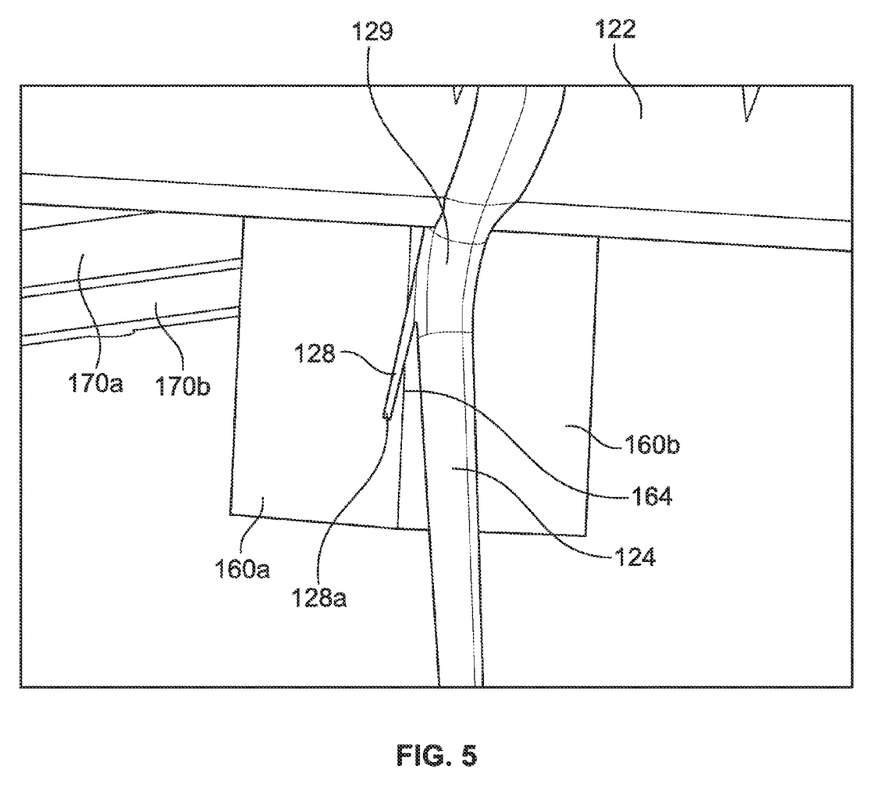

Furthermore, as shown in FIG. 5, when the aerial vehicle 120 is in hover mode during landing, the peg 128 extends downwardly and outwardly from the fuselage 124 towards the perch panel 160. As shown in FIG. 4, the perch panel 160 may be aligned with the tether 130 being guided through a levelwind and onto a rotatable drum 180 that rotates about an axis 184 on tower 150. In this manner, the perch panel 160 faces the fuselage 124 of the aerial vehicle 120 when it is landing. The drum 180 shown in FIGS. 3 and 4 has a horizontal axis of rotation 184. However a vertical drum such as drum 52 shown in FIGS. 1 and 2, or an angled drum could also be used. For example, if a drum rotatable about a horizontal axis is used, the perch platform 172 could be coupled to the drum such that the perch platform 172 extends perpendicularly from the axis of the drum and the tether 130 is wound onto the drum over the perch panel 160. In this manner as the tether 130 is wound onto the drum, the perch panel 130 will always face the aerial vehicle 120 and be in position to receive the peg 128 on the fuselage 124 of the aerial vehicle 120. In fact, the drum could be positioned on the perch platform 172 such that the tether 130 (or center tether bridle 132*b*) extends over the bottom of the groove 164 of the perch panel 160.

As seen in FIG. 4, a bar, such as a T-bar extends from both sides of the perch panel 160 as extensions 162*a* and 162*b*. A pair of hooks 126 (shown in FIG. 3) may be attached to the main wing 122 positioned on opposite sides of the peg 128. Each hook 126 may be located at a point equidistant from the peg 128. The hooks 126 may be positioned on the wing 122 or on the pylons that attach the rotors to the wing 122 of the aerial vehicle 120. In an example embodiment, the hooks 126 are collinear with the bridle attachment points, or are in line with the bridles 132*a* and 132*c* at their point of attachment to the lower pylons 143. In one embodiment, the hooks 126 are located a distance from the bridle attachment points to the wing 122 that is within ¼ of the length of the perch peg 128 in the x body axis of the wing 122. The 128 peg may be positioned on the center of the fuselage 124 extending beneath the center tether bridle 132*b* during landing.

Once the aerial vehicle 120 comes into a final resting place on perch panel 160, there are four points of contact between the aerial vehicle 120 and the ground station 150 to provide a stable final perch for the aerial vehicle 120. In particular, the tether 130 remains attached to the wing 122 and the bridle 132*a-c* exerts a force on the aerial vehicle 120 pulling it towards the tower 150. At the same time the perch panel 160 exerts a force against the peg 128 holding the aerial vehicle 120 tightly to the tower 150. Further, the extending bars 162*a* and 162*b* contact the hooks 126 preventing the top of the aerial vehicle 120 from pitching towards the tower 150. The weight of the aerial vehicle 120 concentrated at the points of contact between the pair of hooks 126 positioned on the extending bars 162*a* and 162*b* prevent the yawing or rolling of the aerial vehicle 120 in its final perched position, as shown in FIGS. 3 and 4. The perch panel 160 may have a height that is between 0.5 and 2 times the length of the perch peg 128 measured from the center of mass of the aerial vehicle 120.

FIG. 5 is a perspective view of peg 128 extending from fuselage 122 and in contact with perch panel side 160*a*. As shown in FIG. 5, as the tether 130 is further wound onto the drum, the bottom 128*a* of the peg 128 comes into contact with the perch panel. The first and second sides 160*a* and 160*b* may have curved, or spherical surface sections that form a groove 164 and the force of the peg 128 against the perch panel 160 forces the end 128*a* of the peg 128 down the curved surface of the side 160*a* of the perch panel 160 and towards bottom of the groove 164. In one embodiment, the peg 128 may not be attached at the center of the wing 122, but instead may be located off from the center of mass of the wing 122 to one side, closer to the inboard wingtip. The fuselage 124 could also be moved to the side in this configuration.

Thus, as illustrated in FIG. 5, the peg 128 may not initially contact the bottom of the groove 164 as the aerial vehicle 120 is landing. Instead, the peg 128 may initially come into contact with the first or second sides 160*a* or 160*b* of the perch panel 160. The force of the tether 130 pulling on the aerial vehicle 120 and the peg pressure against the panel resultant of the pitching moment created by the propellers of the aerial vehicle 120 will cause the bottom 128*a* of peg 128 to move across the curved surface of the first side 160*a* as of perch panel 160 shown in FIG. 5 (that the bottom 128*a* of peg 128 initially contacted) and move down the curved surface of the perch panel side 160*a* into the bottom of the groove 164 on the perch panel 160. A rollerball or caster may be positioned on the bottom 128*a* of the peg 128 to provide a convenient way to make the peg 128 have lower friction at the point of contact with the perch panel 160 and make it easier for the bottom 128*a* of peg 128 to slide into the bottom of the groove 164.

During the critical period between initial contact of the peg 128 with the perch panel 160 and the contact between the pair of hooks 126 and the bars 162*a* and 162*b* extending from the perch panel 160, if there are windy, or gusty conditions, pitching or yawing of the aerial vehicle may be controlled during this critical period with the propellers of the rotors. For example, more or less power from the right or left rotors could be used to control yaw and more or less power from the lower or upper rotors could be used to control pitch.

The peg 128 is preferably located at or near the center of gravity of the aerial vehicle 120, such as at a point located at or near the intersection of the axes of pitch, roll, and yaw. As a result, there will be little or no movement of the peg 128 during pitch, roll, or yaw of the aerial vehicle 120. Therefore, there will be little or no movement of the aerial vehicle 120 at its point of contact with the perch panel 120, i.e. the bottom 128*a* of peg 128.

Figure 6:
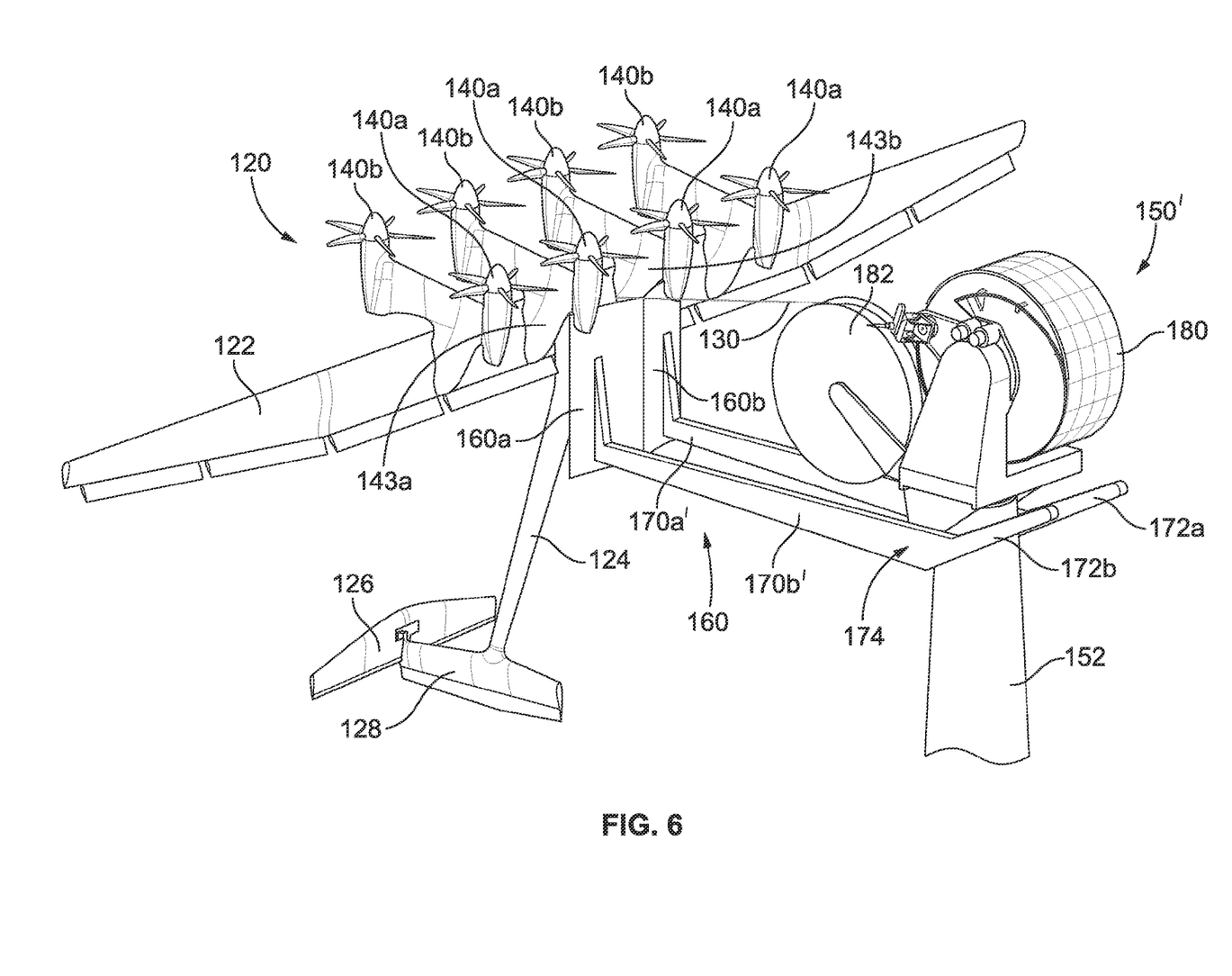
FIG. 6 is a perspective view of aerial vehicle 120 secured to perch 160 with the aerial vehicle 120 and perch 160 in a lowered parked position.
Figure 7:
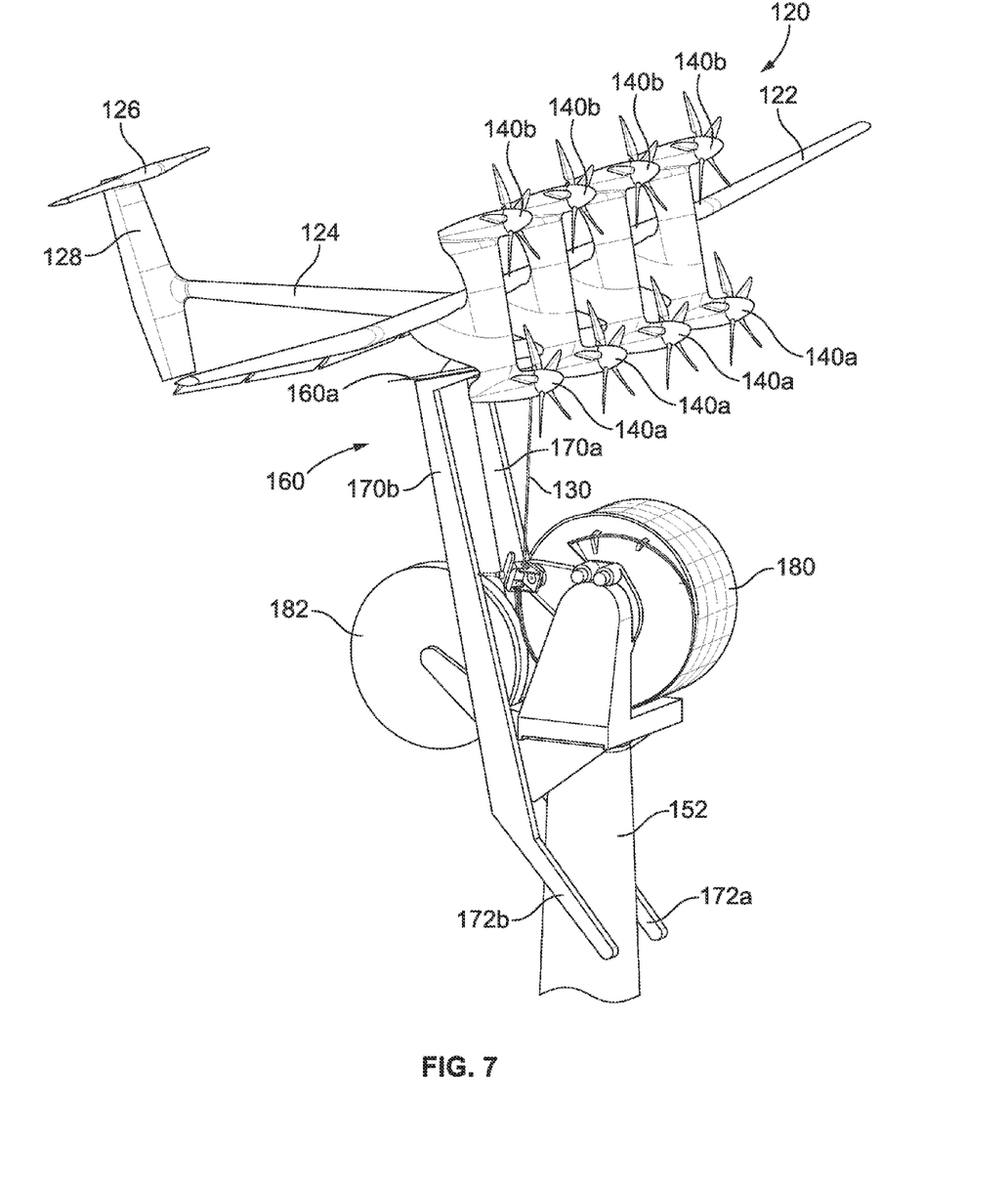
FIG. 7 is a perspective view of aerial vehicle 120 and perch 160 after rotation of the perch and aerial vehicle to a raised parked position.

3. Example Perching System for Raising Aerial Vehicle from a Lowered Parked Position to a Raised Parked Position FIG. 6 is a perspective side view of an airborne wind turbine system including aerial vehicle 120 parked on perch 160 attached to tower 150', with the aerial vehicle 120 and perch 160 positioned in a lowered parked position. FIG. 7 is a perspective view of the aerial vehicle 120 perched on perch 160 in a raised parked position. The airborne turbine system shown in FIGS. 6 and 7 may be the same as the airborne wind turbine system described above and shown in FIGS. 3-5, modified to provide a pivoting perch that allows the aerial vehicle 120 and perch 160 to be rotated upwardly from the lowered parked position shown in FIG. 6 to the raised parked position shown in FIG. 7.

In particular, in FIGS. 6 and 7, tower 150' includes a support 152 upon which rotatable drum 180 and levelwind 182 is positioned. In an embodiment, the support 152 may be 15 meters in height. Aerial vehicle 120 includes a rigid wing 122, fuselage 124, tail pylon 128, and rear pylon 126. Lower rotors 140*a* and upper rotors 140*b* are attached to the rigid wing 122. An electrically conductive tether 130 has one attached to wing 122 of aerial vehicle 120 using bridle lines (not shown), and another end extending through levelwind 182 and onto rotatable drum 180.

Perch 160 having perch panels 160*a* and 160*b* is supported by perch panel support members or perch booms 170*a'* and 170*b'* that extend generally horizontally from the tower 150'. Perch booms 170*a'* and 170*b'* are pivotable about axis 174 relative to tower 150'. It will be appreciated that the perch 160 may be configured differently than as shown in the exemplary embodiment shown in FIGS. 6 and 7, and may not include perch panels. Similarly, two perch booms are shown extending from tower 150', although a single perch boom could also be used. For example, an end of a single perch boom could have a yoke that extends on either side of the tower 150'.

In FIG. 6, aerial vehicle 120 is shown after landing on the perch 160 during hover mode. In this orientation, the fuselage or tail boom 124 is extending downwardly below the perch panels 160*a* and 160*b*. As noted above, after the aerial vehicle 120 has landed on perch 160, there are four points of contact that are used to secure the aerial vehicle to the perch 160, including peg 128 (shown in FIG. 5), hooks 126 (shown in FIG. 4), and tether 130.

However, to further secure the aerial vehicle 120 during rotation from the lowered parked position shown in FIG. 6 to the raised parked position shown in FIG. 7, it is desirable to further secure the aerial vehicle. To this end a latching mechanism may be used that latches the peg to perch panels 160*a* and 160*b*. For example, a cross-member could be attached to peg 128 extending transversely from peg 128. A latching mechanism could be used to rotate over the cross-member to prohibit relative movement of the peg 128 and perch panels 160*a* and 160*b* during rotation from the lowered parked position to the raised parked position. The latching mechanism could be caused to move into a latching position by use of one or more sensors on the bottom of the peg or in the groove 164 between perch panels 160*a* and 160*b* sensing that the aerial vehicle 120 has been properly positioned on the perch panels 160*a* and 160*b*. Other methods of determining when to trigger the latching mechanism may also be used. The latching mechanism may be caused to move into position mechanically by a cam, keyed axle, or gear drive using a linear actuator or motor, as examples.

Although as shown in FIG. 4, a T-bar is used to extend from both sides of the perch panel 160 as extensions 162*a* and 162*b*, in other embodiments the perch panels 160*a* and 160*b* could themselves be extended such that hooks 126 positioned on aerial vehicle 120 come to rest on the tops of the perch panels 160*a* and 160*b* upon landing. Alternately, the pylons 143*a* and 143*b* attaching the lower rotors 140*a* and 140*b* to the rigid wing 122 could come to rest upon the T-bar, or upon the extended perch panels, eliminating the need for a pair of hooks 126 (shown in FIG. 3).

As noted above, once the aerial vehicle 120 is secured to perch 160, the perch booms 170*a*' and 170*b*' may be caused to rotate about axis 174 relative to the tower 150'. Rotation of the aerial vehicle 120 and perch 160 into the raised parked position may advantageously use one or more of the rotors 140*a* and 140*b* on the aerial vehicle 120 to provide the power needed to cause the rotation of the perch booms 170*a*' and 170*b*' relative to the tower. Alternately, or in addition, an electric or hydraulic motor positioned within or on the tower 150' may be used to cause the rotation of perch booms 170*a*' and 170*b*' relative to tower 150'. Once in the desired raised position, a brake or locking mechanism may be utilized to lock the perch booms 170*a*' and 170*b*' in a desired position with respect to the tower 150'. Counterweights 172*a* and 172*b* may be included that extend beyond the tower to reduce the force necessary to cause rotation of perch booms 170*a*' and 170*b*' relative to tower 150'.

It will be appreciated that in the lowered parked position as shown in FIG. 6, the fuselage 124 of the aerial vehicle is pointed downward, and that when the aerial vehicle 120 is moved into the raised parked position as shown in FIG. 7, the fuselage 124 is moved to a generally horizontal position. Thus, clearance from the ground or water is gained not only by the length of the perch booms, but also by the change in orientation of the fuselage 124 of the aerial vehicle 120. In one embodiment, the rotation of the perch booms 170*a*' and 170*b*' may provide 10 meters of additional clearance based on a 6 meter perch boom length, and 4 meters gained by the change in orientation of the aerial vehicle 120.

This system also provides the advantage of utilizing hardware that is already being used (i.e., perch panel, perch booms, wing motors) with minimal new hardware (perch boom pivot) to afford a significant improvement in system efficiency. In particular a shorter tower may be used so as to allow a lower overturning moment which in turn allows the use of less mass in the tower, and the use of a smaller floating platform (having less mass) in the offshore applications. The reduced mass in the tower and the smaller floating platform allow for a reduction in material and costs, resulting in significant cost savings. The pivoting perch booms 170*a*' and 170*b*' allow the aerial vehicle 120 to be parked in a raised parked position, providing further clearance from the ground or waves without the need for a taller tower, or a larger floating platform in the offshore case.

Flying wind turbines are competitive because of their structural efficiency. One of the greatest efficiencies comes from the low traction point (short tower), especially in the offshore case, where a lowered traction point for cross wind flight provides for a lower overturning moment, which advantageously results in significantly lower tower and floating platform mass.

Whether on land or offshore, the present embodiments provide for a short tower during cross wind flight to reduce the overturning moment at the base, which in turn allows for a reduced overall mass of the tower and foundation, and resultant cost savings. The shorter the tower, the lower the overturning moment, the lower the overall mass of the tower and foundation (and floating platform in the offshore case), and the higher the resultant cost savings.

Raising the aerial vehicle into the raised parked position on the perch provides the ability to keep the aerial vehicle high off the ground in its parked condition, to protect it from waves, vandalism, low altitude debris, etc., yet also provide the advantages of having a short tower.

Figure 8A:
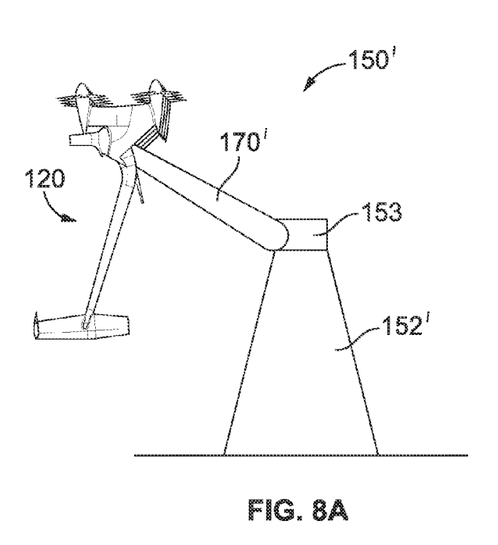
FIG. 8A is a perspective view of aerial vehicle 120 secured to the perch in a first lowered parked position.

FIG. 8A shows airborne wind turbine system 150' having an illustrative simplified tower 152' having perch booms 170' rotatable about a top 153 of tower 152'. Aerial vehicle 120 is shown secured to the perch at the end of perch booms 170' in the first lowered parked position with the aerial vehicle 120 pointing upwardly.

Figure 8B:
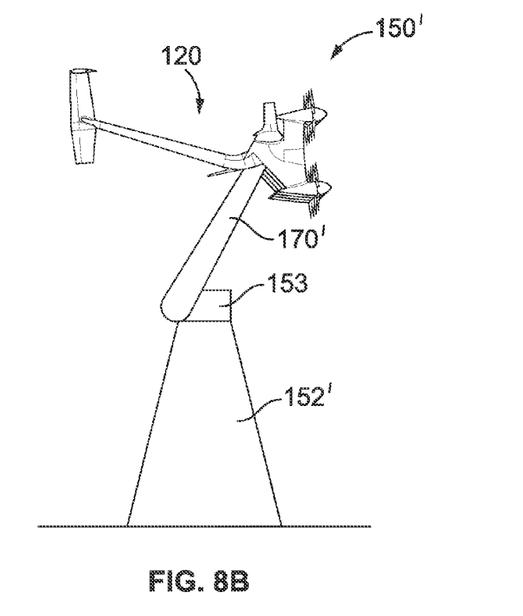
FIG. 8B is a perspective view of aerial vehicle 120 secured to the perch after rotation of the perch and aerial vehicle to a raised parked position.
Figure 8C:
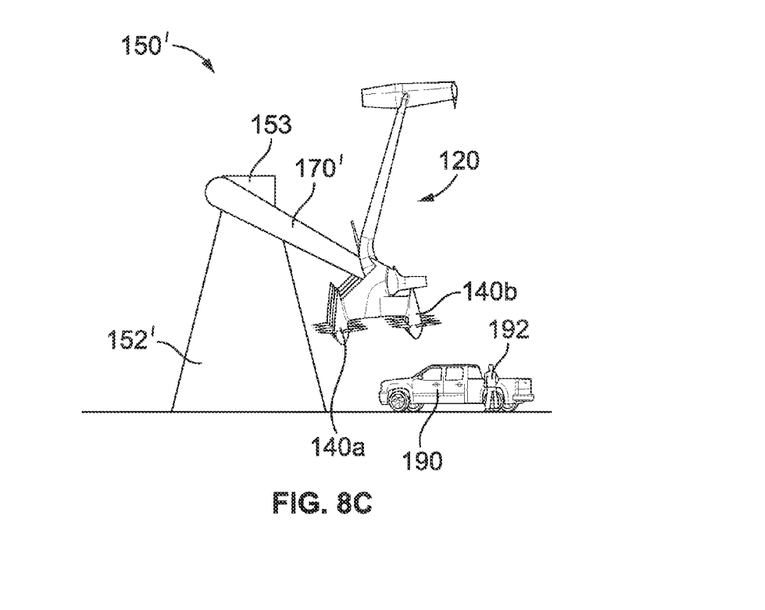
FIG. 8C is a perspective view of aerial vehicle 12 secured to the perch after rotation of the perch and aerial vehicle to a second parked position.

FIG. 8B shows airborne wind turbine system 150' after perch booms 170' have rotated with respect to the top 153 of tower 152' from the first lowered parked position as shown in FIG. 8A into a raised parked position. FIG. 8C illustrates airborne wind turbine 120 after the perch booms 170 have further rotated with respect to the top 153 of tower 152' from the raised parked position to a second lowered parked position with the aerial vehicle pointing downwardly after 180 degree rotation from the first parked position shown in FIG. 8A.

In the second lowered parked position, the rotors 140*a* and 140*b* of aerial vehicle 120 are positioned close to ground where maintenance equipment 192 and maintenance personnel 192 may be located to provide service and maintenance on the rotors 140*a* and 140*b* and other components of the aerial vehicle 120. The ability to have the front of the aerial vehicle 120 closer to the ground allows maintenance to be performed more easily and safely, in comparison to the first lowered parked position shown in FIG. 8A or the raised parked position shown in FIG. 8B.

When moving the aerial vehicle 120 from the raised parked position shown in FIG. 8B to the second lowered parked position shown in FIG. 8C, a brake may be used on the top 153 of tower 152' to gently lower the aerial vehicle into the second lowered parked position. Rotation of the aerial vehicle 120 into the second lowered parked position may also advantageously use one or more of the rotors 140a and 140b on the aerial vehicle 120 to provide the reverse thrust to gently move the aerial vehicle into the second lowered parked position. When maintenance is completed, the rotors 140a and 140b may be used to provide reverse thrust to provide the power needed to cause the rotation of the perch booms 170' back to the raised parked position. Alternately, or in addition, an electric or hydraulic motor positioned within or on the airborne wind turbine system 150' may be used to cause the rotation of perch booms 170' back to the second parked position.

Figure 9:
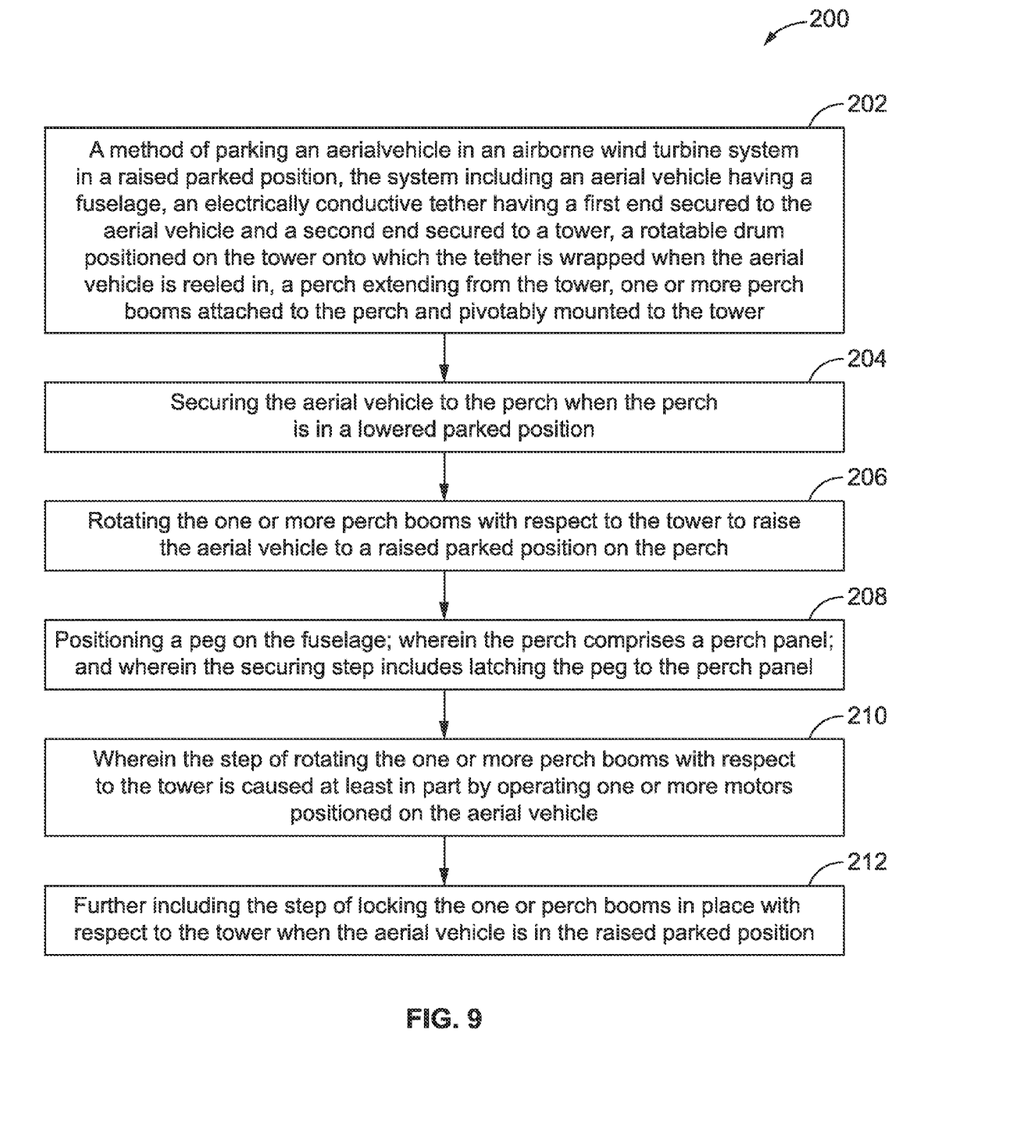
FIG. 9 is a method, according to an example embodiment.

4. Example Method of Parking an Aerial Vehicle on an Airborne Wind Turbine in a Raised Parked Position FIG. 9 shows a method 200 that may be used for parking an aerial vehicle on an airborne wind turbine system in a raised parked position. The method includes the step 202 of providing an airborne wind turbine system including an aerial vehicle having a fuselage, an electrically conductive tether having a first end secured to the aerial vehicle and a second end secured to a tower, a rotatable drum positioned on the tower onto which the tether is wrapped when the aerial vehicle is reeled in, a perch extending from the tower, and one or more perch booms attached to the perch and pivotably mounted to the tower.

Method 200 also includes the step 204 of securing the aerial vehicle 120 to the perch 160 when the perch 160 is in a lowered parked position, and the step, and the step 206 of rotating the one or more perch booms 170a' and 170b' with respect to the tower to raise the aerial vehicle to a raised parked position on the perch.

Method 200 further includes the step 206 of rotating the one or more perch booms 170a' and 170b' with respect to the tower 150' to raise the aerial vehicle 120 to a raised parked position on the perch 160; the step 208 of positioning a peg 128 on the fuselage 124; wherein the perch 160 comprises a perch panel; and wherein the securing step includes latching the peg 128 to the perch panel; the step 210 wherein the step of rotating the one or more perch booms 170a' and 170b' with respect to the tower 150' is caused at least in part by operating one or more motors positioned on the aerial vehicle 120; and further including the step 212 of locking the one or perch booms 170a' and 170b' in place with respect to the tower 150' when the aerial vehicle 120 is in the raised parked position.

5. Conclusion

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. An airborne wind turbine system, comprising:
an aerial vehicle having a fuselage;
an electrically conductive tether having a first end secured to the aerial vehicle and a second end secured to a rotatable drum positioned on a tower onto which the tether is wrapped when the aerial vehicle is reeled in;
a perch extending from the tower;
one or more perch booms attached to the perch and pivotably mounted to the tower;
wherein when the aerial vehicle is secured to the perch, the aerial vehicle is positionable in a first lowered parked position where a rear end of the fuselage extends downwardly; and
wherein the aerial vehicle is movable to a raised parked position caused by rotation of the one or more perch booms with respect to the tower wherein the fuselage is positioned in a generally horizontal position.

2. The system of claim 1, wherein rotation of the one or more perch booms with respect to the tower to move the aerial vehicle to the raised parked position is caused by one or more motors positioned on the aerial vehicle.

3. The system of claim 1, wherein the one or more perch booms extend beyond the tower to provide a counterweight.

4. The system of claim 1, wherein the tower includes a latch mechanism to lock the one or more perch booms into a desired position with respect to the tower when the aerial vehicle is in the raised parked position.

5. The system of claim 1, wherein the tower includes a brake to prevent rotation of the one or more perch booms with respect to the tower beyond a certain predetermined point when the aerial vehicle is moved into the raised parked position.

6. The system of claim 1, wherein the tower is positioned on a floating platform.

7. The system of claim 1, wherein rotation of the one or more perch booms with respect to the tower to move the aerial vehicle to the raised parked position is caused at least in part by a motor positioned on the tower.

8. The system of claim 7, wherein the motor is a hydraulic motor.

9. The system of claim 1, further including:
wherein the perch comprises a perch panel;
a peg positioned on the fuselage;
a first extension extending from a first side of the perch panel;
a second extension extending from a second side of the perch panel;
a first hook extending from the aerial vehicle on a first side of the peg;
a second hook extending from the aerial vehicle on a second side of the peg opposite the first side;
wherein when the aerial vehicle is perched on the perch panel, the peg is in contact with the perch panel, the first hook is positioned over the first extension, and the second hook is positioned over the second extension.

10. The system of claim 9, wherein the first hook is attached to a first rotor pylon on the aerial vehicle and the second hook is attached to a second rotor pylon on the aerial vehicle.

11. The system of claim 9, wherein the perch panel has a first side adjacent a second side with a groove vertically extending between the intersection of the first side and the second side.

12. The system of claim 11, wherein the first side has a curved surface extending towards the groove and the second side has a curved surface extending towards a bottom of the groove.

13. The system of claim 1, wherein the perch panel includes a latching mechanism to latch a peg positioned on the fuselage to the perch panel.

14. The system of claim 13, wherein the latching mechanism is caused to move into a latched position by the movement of a cam.

15. The system of claim 1, wherein the aerial vehicle is movable from the raised parked position to a second lowered parked position by further rotation of the one or more perch booms with respect to the tower where the rear end of the fuselage extends upwardly.

16. The system of claim 15, wherein the second lowered parked position is located 180 degrees from the first lowered parked position.

17. A method of parking an aerial vehicle in an airborne wind turbine system in a raised parked position, the system including an aerial vehicle having a fuselage, an electrically conductive tether having a first end secured to the aerial vehicle and a second end secured to a tower, a rotatable drum positioned on the tower onto which the tether is wrapped when the aerial vehicle is reeled in, a perch extending from the tower, one or more perch booms attached to the perch and pivotably mounted to the tower, comprising the steps of:

securing the aerial vehicle to the perch when the perch is in a first lowered parked position with a rear end of the fuselage extending downwardly;

rotating the one or more perch booms with respect to the tower to raise the aerial vehicle to a raised parked position on the perch where the fuselage is positioned in a generally horizontal position.

18. The method of claim 17, further including:
positioning a peg on the fuselage;
wherein the perch comprises a perch panel; and
wherein the securing step includes latching the peg to the perch panel.

19. The method of claim 17, wherein the step of rotating the one or more perch booms with respect to the tower is caused at least in part by operating one or more motors positioned on the aerial vehicle.

20. The method of claim 17, further including the step of locking the one or perch booms in place with respect to the tower when the aerial vehicle is in the raised parked position.

21. The method of claim 17, further including the step of further rotating the one or more perch booms with respect to the tower to lower the aerial vehicle into a second lowered parked position where the rear end of the fuselage extends upwardly.

22. The method of claim 21, wherein the second lowered parked position is located 180 degrees from the first lowered parked position.

23. A perching system for use in an airborne wind turbine system, comprising:

a perching tower;

a perch extending from the tower, the perch adapted to receive an aerial vehicle;

one or more perch booms attached to the perch and pivotably mounted to the tower;

wherein when the aerial vehicle is secured to the perch, the perch and aerial vehicle are positionable in a first lowered parked position with a rear end of a fuselage of the aerial vehicle extending downwardly; and wherein the perch and aerial vehicle are movable to a raised parked position caused by rotation of the one or more perch booms with respect to the tower; and wherein the fuselage extends generally horizontally when the aerial vehicle is in the raised parked position.

24. The perching system of claim 23, wherein rotation of the one or more perch booms with respect to the perching tower is caused at least in part by operating one or more motors positioned on the aerial vehicle.

25. The perching system of claim 23, wherein the perching tower is positioned on a floating platform.

* * * * *